United States Patent [19]
Takahashi et al.

[11] Patent Number: 4,754,995
[45] Date of Patent: Jul. 5, 1988

[54] THIN-WALLED CONNECTING PIPE FOR PIPELINE AND COUPLING STRUCTURE FOR SAME

[75] Inventors: Seitaro Takahashi, Ageoshi; Isamu Hattori, Hatogayashi; Koji Izumi, Tonemachi, all of Japan

[73] Assignee: Sankyo Denso Kabushiki Kaisha, Takasaki, Japan

[21] Appl. No.: 47,626

[22] Filed: May 7, 1987

[30] Foreign Application Priority Data

May 27, 1986 [JP] Japan .................. 61-120111

[51] Int. Cl.$^4$ .................................. F16L 17/02
[52] U.S. Cl. ..................... 285/353; 285/39; 285/187; 285/351; 285/369
[58] Field of Search ............ 285/353, 233, 356, 39, 285/187, 351, 369

[56] References Cited

U.S. PATENT DOCUMENTS

| 2,599,389 | 6/1952 | Hume | 285/353 X |
| 2,983,506 | 5/1961 | Bertsch et al. | 285/356 X |
| 4,614,372 | 9/1986 | Gschwind | 285/356 |

FOREIGN PATENT DOCUMENTS

| 781227 | 5/1935 | France | 285/356 |
| 1027971 | 5/1966 | United Kingdom | 285/356 |

Primary Examiner—Dave W. Arola
Attorney, Agent, or Firm—Emmanuel J. Lobato; Robert E. Burns

[57] ABSTRACT

A thin-walled connecting pipe for pipeline, having an annular protuberance formed at a predetermined distance from a pipe end, the annular protuberance having an outer side face serving as a disengagement preventing face approximately perpendicular to the pipe axis, and the outer peripheral surface of a straight pipe portion on a front end side with respect to the annular protuberance serving as a seal ring abutting surface. Also disclosed is a coupling structure for such thin-walled connecting pipe, the coupling structure comprising a socket and an annular nut, the socket having a seal ring for abutment with the seal ring abutting surface of the pipe and a recess for receiving the annular protuberance of the pipe therein, the annular nut having a fore end face for abutment with the outer side face of the pipe and a flange for abutment with an outer end face of the socket, the nut having an inside diameter equal to the pipe diameter and being fitted on the pipe in threaded engagement with internal threads formed on the inner peripheral surface of an outer end portion of the socket adjacent to the recess of the socket.

11 Claims, 2 Drawing Sheets

THIN-WALLED CONNECTING PIPE FOR PIPELINE AND COUPLING STRUCTURE FOR SAME

DESCRIPTION OF THE INVENTION

The present invention relates to a thin-walled pipe which does not permit the formation of a threaded portion on the outer periphery of its end portions, and a novel coupling structure for same.

(BACKGROUND OF THE INVENTION AND THE PRIOR ART)

The iron pipe used as a water supply pipe is apt to corrode and form sludge on its inner surface and its service life is short.

Owing to such disadvantages of the iron pipe, the use of a stainless steel pipe light in weight and superior in corrosion resistance has recently been taken note of. Stainless steel pipes are thin-walled in comparison with their diameters and so cannot be threaded for coupling at their end portions. For this reason it is impossible to adopt the conventional coupling structure and it is necessary to provide a special coupling.

Essential functions required of a coupling for a thin-walled pipe are to prevent movement in the axial direction of the pipe, that is, to prevent disengagement of the pipe, and to ensure watertightness against positive and negative pressures in the pipe.

A thin-walled pipe coupling has heretofore been proposed and known in U.S. Pat. No. 4,438,954, in which the outer periphery of the pipe is clamped with a C-shaped clamp ring to prevent disengagement of the pipe. In this structure, however, the disengagement preventing effect is extremely insufficient; besides, not only the clamp edge can damage the outer periphery of the pipe, making it impossible to re-use the pipe, but also there is fear of deformation of the pipe because the clamping force is not uniformly applied to the pipe outer periphery.

Further, there has also been proposed a thinwalled pipe coupling of a structure in which a pipe end is reduced in diameter inwards and a packing is brought into abutment with the outer tapered surface to provide a sealing surface. However, this coupling has an essential drawback that a slight change in pipe length immediately leads to the loss of sealability.

SUMMARY OF THE INVENTION

According to the present invention there is provided a thin-walled connecting pipe in which an end side of the thin-walled pipe is formed with an annular protuberance having a generally perpendicular outer side face as an urging face for the prevention of disengagement of the pipe, and the outer peripheral surface of the pipe on the fore end side with respect to the annular protuberance serves as a sealing surface.

Further, a coupling structure suitable for the above thin-walled pipe is also provided according to the present invention.

The pipe coupling structure of the present invention comprises a female member, i.e., a socket, for insertion therein of an end portion of the above formed pipe, and an annular nut, the socket including a seal packing adapted to contact the sealing surface of the pipe, a recess for receiving therein the annular protuberance of the pipe and internal threads formed on the inner peripheral surface of an outer end portion of the socket adjacent to the said recess, and the annular nut having an inside diamter equal to the diameter of the pipe and further having a fore end face for abutment with the outer side face of the annular protuberance of the pipe, and a flange for abutment with an outer end face of the female member, the annular nut being fitted on the pipe in threaded engagement with the internal threads of the socket.

The thin-walled pipe coupling structure of the present invention is applicable to all pipe connections, including valves and pumps, not to mention pipe couplings.

Embodiments of the present invention applied to pipe coupling will be described below together with a pipe structure with reference to the accompanying drawings.

DESCRIPTION OF THE PREFERRED EMBODIMENT

Figure 1:
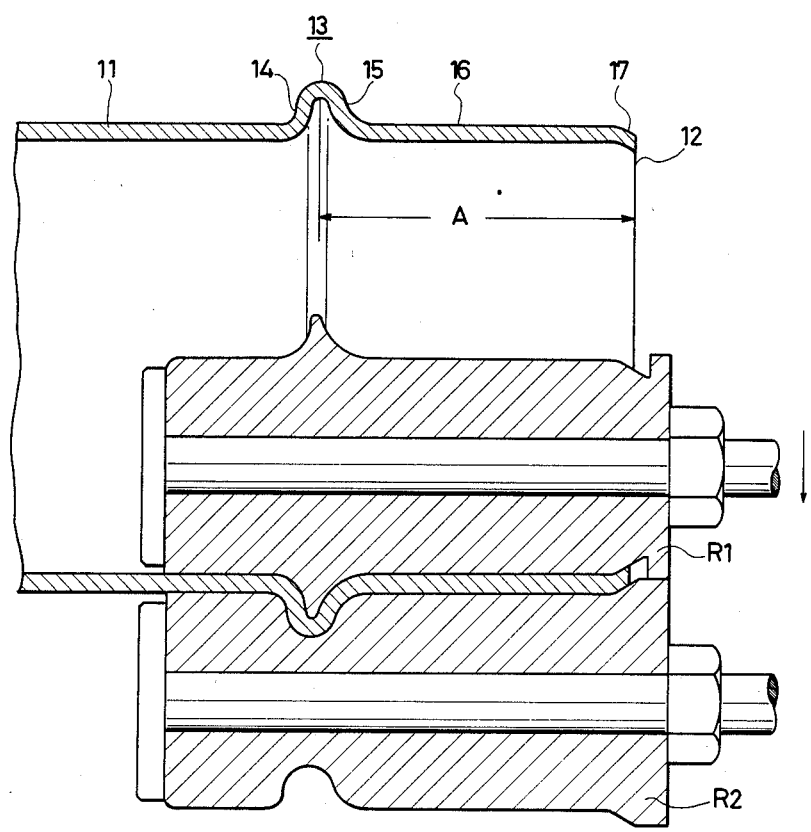
FIG. 1 is a sectioned view showing an end portio of the pipe and the means used to form the end portion.

FIG. 1 is a sectional view showing a structure of an end portion of a thin-walled pipe together with a forming means. Numeral 11 denotes a thin-walled stainless steel pipe having a diameter of 30 mm and a thickness of about 1 mm; numeral 12 denotes a pipe edge; numeral 13 denotes an annular protuberance formed in a position at a predetermined distance (A) from the pipe edge; numeral 14 denotes an outer side face for abutment therewith of a disengagement preventing clamping nut; numeral 15 denotes an inner curved surface; numeral 16 denotes a sealing surface of the outer periphery of a straight portion on the front end side of the pipe; and numeral 17 denotes an arcuate surface formed along the outer periphery at the pipe edge portion.

This pipe structure can also be formed in the field. In this case, the pipe 11 is chucked and rotated, then a pair of forming rollers R1 and R2 each having a predetermined sectional shape are brought into pressure contact with the inside and outside of the pipe.

Figure 2:
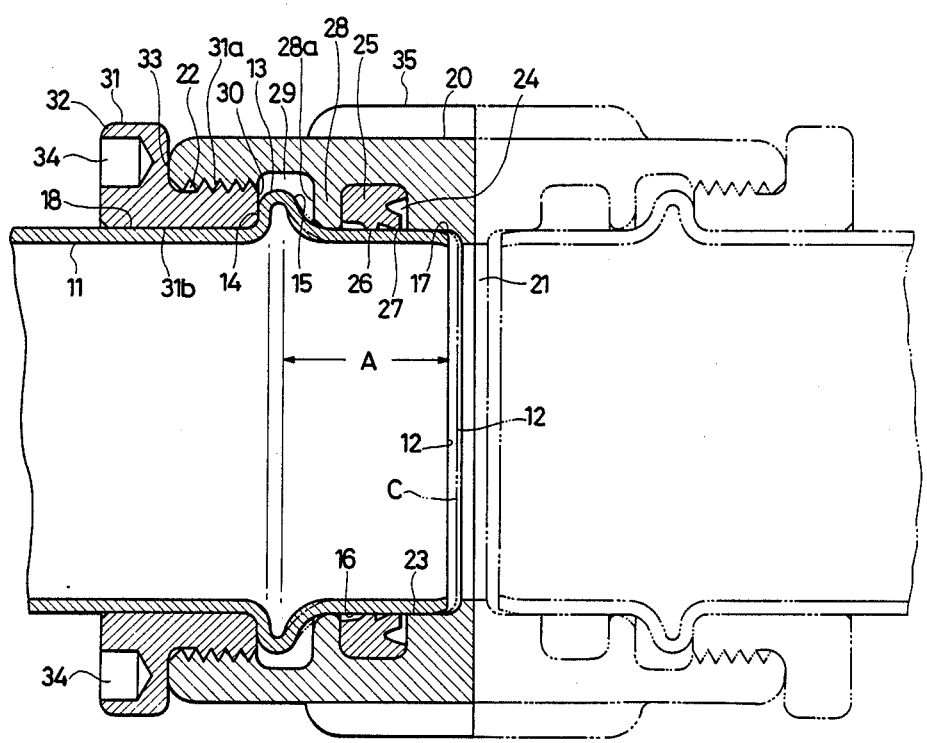
FIG. 2 shows the assembled coupling.

FIG. 2, is a semi-sectional view of a coupling in a coupled state with the pipe end portion inserted therein. A socket 20 which forms a coupling body is symmetric with respect to a partition 21 and has internal threads 22 formed at both end portions thereof. The following description on the socket structure will refer to only one side of the symmetry.

In an inner peripheral surface 23 of the socket in a position corresponding to the sealing surface or inserted portion of the pipe there is formed a receiving slot 24, in which is fitted at least one seal ring 25 made of rubber or plastic. In the case of a single seal ring 25, it is preferable that the socket be provided with a sealing surface 26 which resists intra-pipe negative pressure and a sealing surface 27 for preventing water leakage caused by internal pressure.

Figure 3:
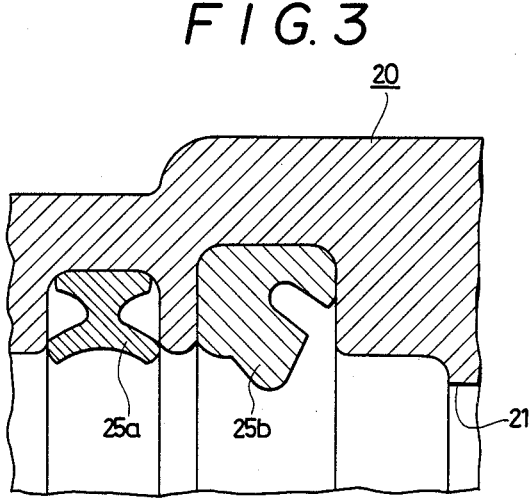
FIG. 3 shows a second embodiment of the invention incorporating two seal members.

FIG. 3 is a partially sectional view of a coupling before pipe insertion which coupling is provided with two seal rings 25a and 25b. This coupling is applied to a portion where an inside-outside differential pressure varies violently.

Numeral 28 denotes a partition wall and numeral 29 denotes an annular receiving recess or chamber for the annular protuberance 13, formed between the partition wall 28 and an urging end face 30. Numeral 31 denotes an annular nut for preventing disengagement of the pipe which is fitted therein. A flange 32 of the annular nut 31 is rotated until it comes into pressure contact with an end face 33 of the socket, and at the same time, the urging end face 30 at the fore end of a screw 31a urges the outer side face 14 of the annular protuberance, to thereby prevent shaking and axial movement of the pipe. It is desirable that the curved surface side 15 of the annular protuberance be not urged against a partition wall surface 28a by the above urging action.

It is therefore necessary that the recess 29 be formed larger in width than the annular protuberance. Further, as a matter of course, the pipe end 12 must leave a spacing which permits expansion of the pipe even in a clamped state without contact with the partition 21 and any other portion in the socket.

This is because if the curved surface side 15 of the annular protuberance is brought into strong pressure contact with the partition wall surface 28a or if the pipe end 12 is urged against the partition 21, the resulting stress will reach the sealing surface 16 on the front end side, resulting in impairment of sealability.

Numeral 34 denotes a hole for insertion therein of a nut rotating tool. The use of a forked wrench or the like, not the ordinary type of spanner, permits easy work at a narrow place, for example, on the ceiling. The shape of the nut 31 is not limited to the one described above. An annular nut with internal threads and having the urging end face 30 is also employable. Numeral 35 denotes a reinforcing rib which also serves as a swivel stop for the socket.

In the couplings described above, the sealability is ensured against pipe inside and outside pressures at the outer periphery 16 of the straight pipe portion on the front end side which has not been subjected to deformation processing. For preventing movement of the pipe, the outer side face 14 of the annular protuberance is brought into abutment with the urging end face 30 at the front end of the nut 31 which is threadedly engaged integrally with the socket, and an inner peripheral surface 31b of the nut receives grippingly therein an outer peripheral surface 18 of the pipe positioned outside with respect to the annular protuberance 13, so that strong resistance is ensured against external forces acting in both axial and radial directions of the pipe.

Moreover, the space of the recess 29 which receives the annular protuberance 13 therein functions to compensate for the movement of the protuberance 13 to prevent deformation of the entire pipeline when, for example, high-temperature water flows through the thin-walled pipe and causes the pipe to expand in the axial direction.

Although the straight pipe portion 16 also moves with expansion and contraction of the pipe, the sealability is not affected at all because the outer peripheral surface of the straight pipe portion merely slides with respect to the seal contact surface. deforming force during mounting and use, so the pipe after removal can be re-used in another pipeline, and thus the durability of a stainless steel pipe can be exhibited effectively, which eventually permits the provision of an economical pipeline.

It goes without saying that the coupling structure of the present invention is applicable not only to stainless steel pipes but also to other pipes capable of being subjected to deformation processing. Further, it is also applicable to a pump having only one opening portion for connection or two or more couplings.

What is claimed is:

1. A coupling arrangement for fluid carrying pipes coprising, a first pipe having a radially extending circumferential protuberance spaced axially from an end of the pipe, a coupling socket for coupling to said first pipe and having a through opening for receiving said end of said first pipe including said circumferential protuberance thereon, said socket having an internal thread at the opening thereof, an externally threaded nut disposed circumferentially of said first pipe and screwed in said socket internal thread, said nut having an annular end surface bearing on a face of said protuberance, and complementary thereto, said socket having two internal circumferential recesses axially spaced from said opening and a circumferential partition between the recesses, said protuberance being received in one of the two recesses disposed closer to said opening, the protuberance having a radius of curvature at said first pipe and against which the partitino bears without contacting a proximate face of the protuberance disposed on a side of the protuberance opposite to the face contacted by the annular end surface of said nut, the protuberance being unsymmetrical in axial cross section, a circumferential ring seal disposed in a second of the two recesses effecting a seal circumferentially of the first pipe adjacent said partition, the socket having an internal circumferential shoulder surface from which said end of the first pipe is spaced, said externally threaded nut biasing the protuberance in a direction toward said shoulder surface so that said end of the first pipe is spaced from the shoulder surface, and said externally threaded nut biasing the socket in an axial direction for engaging said partition with said radius of curvature of the protuberance.

2. A coupling arrangement for fluid carrying pipes according to claim 1, in which said partition has a surface complementary with said radius of curvature and in close contact therewith.

3. A coupling arrangement for fluid carrying pipes according to claim 1, in which said socket is symmetrical relative to a plane passing transversely thereof and disposed axially spaced from said internal circumferential shoulder surface in a direction away from said first pipe.

4. A coupling arrangement for fluid carrying pipes according to claim 1, in which the symmetrical socket is configured to receive second pipe having a circumferential protuberance, and said second pipe being received extending into said through opening of the socket.

5. A coupling arangement for fluid carrying pipes according to claim 1, in which said socket includes means for connecting a second pipe to said socket to place said first pipe and said second pipe in communication.

6. A coupling arrangement for fluid carrying pipes according to claim 1, in which said socket has an axial rib externally thereof for acting as a stop to avoid rotation of the socket.

7. A coupling arrangement for fluid carrying pipes according to claim 1, in which said nut has an axial annular flange, said flange having said external male thread screwed into the internal thread of said socket.

8. A coupling arrangement for fluid carrying pipes comprising, in combination, a first pipe having a radially extending circumferential protuberance spaced axially from an end of the pipe, a coupling socket coupled to said first pipe and having a through opening receiving said end of said first pipe including said circumferential protuberance thereon, said socket having an internal thread at the opening thereof, an externally threaded nut disposed circumferentially of said first pipe and screwed in said socket internal thread, said nut having an annular end surface bearing on a face of said protuberance, and complementary thereto, said socket havnig two internal circumferential recesses axially spaced from said opening and a circumferential partition between the recesses, said protuberance being received in one of the two recesses disposed closer to said opening, the protuberance having a radius of curvature at said first pipe and against which the partition bears without contacting a proximate face of the protuberance disposed on a side of the protuberance opposite to the face contacted by the annular end surface of said nut, the protuberance being unsymmetrical in axial cross section, a circumferential ring seal disposed in a second of the two recesses effecting a seal circumferentially of the first pipe adjacent said partition, the socket having an internal circumferential shoulder surface from which said end of the first pipe is spaced, said externally threaded nut biasing the protuberance in a direction toward said shoulder surface so that said end of the first pipe is spaced from the shoulder surface, and said externally threaded nut biasing the socket in an axial direction for engaging said partition with said radius of curvature of the protuberance.

9. The combination according to claim 8, in which said coupling socket is axially symmetrical relative to a median transverse plane spaced axially away from said end of said first pipe.

10. The combination according to claim 9, in which said protuberance is spaced from said partition to allow it to expand in said one recess.

11. The combination according to claim 10, including a second pipe, said second pipe having a protuberance and received in said coupling socket in communication with the first pipe, and a second externally threaded nut screwed on the socket and configured for functioning similarly to the first mentioned nut.

* * * * *